US008737030B2

(12) United States Patent
Valdes

(10) Patent No.: US 8,737,030 B2
(45) Date of Patent: May 27, 2014

(54) POWER DISTRIBUTION SYSTEMS AND METHODS OF OPERATING A POWER DISTRIBUTION SYSTEM

(75) Inventor: Marcelo Esteban Valdes, Burlington, CT (US)

(73) Assignee: General Electric Company, Schenectady, NY (US)

(*) Notice: Subject to any disclaimer, the term of this patent is extended or adjusted under 35 U.S.C. 154(b) by 64 days.

(21) Appl. No.: 13/619,496

(22) Filed: Sep. 14, 2012

(65) Prior Publication Data
US 2014/0078631 A1 Mar. 20, 2014

(51) Int. Cl.
H02H 3/00 (2006.01)
(52) U.S. Cl.
USPC .............................................. 361/62; 361/64
(58) Field of Classification Search
USPC ..................................................... 361/62–70
See application file for complete search history.

(56) References Cited

U.S. PATENT DOCUMENTS

| 4,528,611 | A  | * | 7/1985  | Udren ............................. 361/81 |
| 5,038,246 | A  |   | 8/1991  | Durivage, III |
| 5,467,069 | A  |   | 11/1995 | Payet-Burin et al. |
| 5,905,616 | A  |   | 5/1999  | Lyke |
| 6,137,665 | A  |   | 10/2000 | Boudaud |
| 6,297,939 | B1 |   | 10/2001 | Bilac et al. |
| 6,313,975 | B1 |   | 11/2001 | Dunne et al. |
| 6,633,474 | B1 |   | 10/2003 | Boudaud |
| 7,254,001 | B2 | * | 8/2007  | Papallo et al. .................. 361/64 |
| 7,525,782 | B1 |   | 4/2009  | Hedrick et al. |
| 2005/0141163 | A1 |   | 6/2005 | Franke et al. |
| 2008/0012667 | A1 |   | 1/2008 | Colsch et al. |
| 2008/0198521 | A1 |   | 8/2008 | Weiher et al. |
| 2009/0257157 | A1 |   | 10/2009 | Vicente et al. |
| 2009/0257158 | A1 |   | 10/2009 | Vicente et al. |
| 2010/0164503 | A1 |   | 7/2010 | Sawhney et al. |
| 2010/0204933 | A1 |   | 8/2010 | Lagree |
| 2011/0141633 | A1 |   | 6/2011 | Fasano |
| 2012/0014026 | A1 |   | 1/2012 | Narel et al. |

OTHER PUBLICATIONS

"Zone Based Protection for Low Voltage Systems; Zone Selective Interlocking, Bus Differential and The Single Processor Concept", Pulp and Paper Industry Technical Conference, 2008, PPIC 2008. Conference Record of 2008 54th Annual, Issue Date: Jun. 22-27, 2008. On pp. 164-173, Reference Cited: 2, ISSN: 0190-2172, On pp. 164-173.
"Application Of New Technologies In Power Circuit Breakers With Higher Interrupting Capacity And Short time Ratings". Pulp and Paper Industry Technical Conference, 1999. Conference Record of 1999 Annual, Issue Date: Jun. 21-25, 1999, On pp. 27-41, Print ISBN: 0-7803-5526-1.

* cited by examiner

Primary Examiner — Danny Nguyen
(74) Attorney, Agent, or Firm — General Electric Company

(57) ABSTRACT

A power distribution system includes a first circuit protection device and a second circuit protection device coupled to the first circuit protection device downstream of the first circuit protection device. The second circuit protection device includes a trip mechanism configured to interrupt a current flowing through the second circuit protection device, and a trip unit operatively coupled to the trip mechanism. The trip mechanism is configured to determine, for the second circuit protection device, a protective threshold and a blocking threshold that is lower than the protective threshold, transmit a forward blocking signal to the first circuit protection device upon a determination that the current exceeds the blocking threshold, and generate a reverse blocking signal upon a determination that the current exceeds the protective threshold.

20 Claims, 5 Drawing Sheets

POWER DISTRIBUTION SYSTEMS AND METHODS OF OPERATING A POWER DISTRIBUTION SYSTEM

BACKGROUND OF THE INVENTION

The present application relates generally to power systems and, more particularly, to power distribution systems and methods of operating a power distribution system.

Known electrical distribution systems include a plurality of switchgear lineups including circuit breakers that that are each coupled to one or more loads. The circuit breakers typically include a trip unit that controls the circuit breakers based upon sensed current flowing through the circuit breakers. More specifically, the trip unit causes current flowing through the circuit breaker to be interrupted if the current is outside of acceptable conditions defined by current and time thresholds.

For example, at least some known circuit breakers are programmed with one or more current thresholds (also known as "pickup" thresholds) that identify undesired current levels for the circuit breaker. If a fault draws current in excess of one or more current thresholds for a predetermined amount of time, for example, the trip unit typically activates the associated circuit breaker to stop current from flowing through the circuit breaker or initiates a timing sequence that eventually activates the circuit breaker if the threshold is exceeded for a predetermined amount of time. However, in power distribution systems that include a plurality of circuit breakers, a typical arrangement uses a hierarchy of circuit breakers. Large circuit breakers (i.e., circuit breakers with a high current rating) that are positioned closer to a power source than a plurality of lower current feeder circuit breakers feed the lower current feeder circuit breakers. Each feeder circuit breaker may feed a plurality of other circuit breakers, which connect to loads or other distribution equipment.

A fault may occur anywhere in the circuit breaker hierarchy. When a fault occurs, each circuit breaker that has the same fault current flowing through it may measure the same fault current differently as a result of varying sensor and circuit tolerances. When the fault occurs, the circuit breaker closest to the fault should trip to stop current from flowing through the circuit breaker. If a circuit breaker higher in the hierarchy, that is, closer to the source than the circuit breaker closest to the fault, trips, multiple circuits or loads will unnecessarily lose service.

To accommodate for the varying tolerances and to ensure that multiple circuit breakers do not unnecessarily trip based on the same fault current due to measurement variance, the current thresholds of at least some known circuit breakers are nested with each other to avoid overlapping fault current thresholds. For example, thresholds for circuit breakers at upper levels of the hierarchy typically are higher than the thresholds for circuit breakers at lower levels of the hierarchy to avoid overlapping thresholds. The nested fault current thresholds cause circuit breakers at higher tiers or levels of the hierarchy to have increasingly higher current thresholds. Accordingly, circuit breakers at higher tiers may not be able to detect fault currents that lower tier circuit breakers may detect. In this way, the circuit breaker closest to the fault will operate in response to the fault and will have a lower fault current threshold than upper level circuit breakers. If a fault occurs at a higher level in the hierarchy, for example, between a feeder and a branch or between a main breaker and a feeder, the system may have a reduced fault detection sensitivity because the circuit breakers at the higher levels of the hierarchy have higher fault current thresholds that may not detect a damaging fault current within the higher levels.

BRIEF DESCRIPTION OF THE INVENTION

In one aspect, a power distribution system is provided that includes a first circuit protection device and a second circuit protection device coupled to the first circuit protection device downstream of the first circuit protection device. The second circuit protection device includes a trip mechanism configured to interrupt a current flowing through the second circuit protection device, and a trip unit operatively coupled to the trip mechanism. The trip mechanism is configured to determine, for the second circuit protection device, a protective threshold and a blocking threshold that is lower than the protective threshold, transmit a forward blocking signal to the first circuit protection device upon a determination that the current exceeds the blocking threshold, and generate a reverse blocking signal upon a determination that the current exceeds the protective threshold.

In another aspect, a power distribution system is provided that includes a first circuit protection device, a second circuit protection device coupled to the first circuit protection device downstream of the first circuit protection device, and a controller coupled to the first circuit protection device and to the second circuit protection device. The controller is configured to determine a first protective threshold for the first circuit protection device, and determine a second protective threshold and a blocking threshold for the second circuit protection device, wherein the blocking threshold is lower than the second protective threshold. The controller is also configured to determine whether a current flowing through the first circuit protection device exceeds the first protective threshold, determine whether a current flowing through the second circuit protection device exceeds the blocking threshold, and transmit a trip signal to the second circuit protection device upon the determination that the current flowing through the first circuit protection device exceeds the first protective threshold and upon the determination that the current flowing through the second circuit protection device exceeds the blocking threshold for a predetermined amount of time.

In yet another aspect, a method of operating a power distribution system including a first circuit protection device and a second circuit protection device coupled to the first circuit protection device downstream of the first circuit protection device is provided. The method includes measuring a current flowing through the second circuit protection device, determining, by a processor, whether the current exceeds at least one of a blocking threshold and a protective threshold, wherein the blocking threshold is lower than the protective threshold, transmitting a forward blocking signal to the first circuit protection device upon a determination that the current exceeds the blocking threshold, and generating a reverse blocking signal upon a determination that the current exceeds the protective threshold.

DETAILED DESCRIPTION OF THE INVENTION

Exemplary embodiments of power distribution systems and methods of operating a power distribution system are described herein. In an exemplary embodiment, the power distribution system includes a plurality of circuit protection devices arranged in a plurality of tiers. Each circuit protection device includes a trip unit programmed with a protective threshold that operates at an unrestrained protective timing (i.e., using an unrestrained time threshold) to operate the circuit protection device and a blocking threshold that causes a blocking signal to be generated and transmitted to circuit protection devices in upstream tiers. If a current is detected that exceeds the blocking threshold, a blocking signal is transmitted to a trip unit of a circuit protection device upstream from the trip unit that detected the current. The blocking signal notifies the upstream trip unit that the blocking threshold has been exceeded by a circuit protection device in a lower tier, and the upstream trip unit switches from an unrestrained mode of operation to a restrained mode of operation. If the current exceeds the protective threshold, and a blocking signal has not been received from a downstream trip unit, the trip unit initiates an unrestrained trip timing sequence. If the blocking signal has been received from a downstream trip unit and if the current exceeds the protective threshold, the trip unit initiates a restrained trip timing sequence.

In addition, if the current exceeds the protective threshold, the trip unit generates a reverse blocking signal and transmits the reverse blocking signal to downstream trip units. Each trip unit determines whether to enter a trip timing sequence based on whether the trip unit received a reverse blocking signal and whether the trip unit generated a blocking signal (i.e., whether the current exceeds the blocking threshold). For example, if a trip unit generated a blocking signal and also received a reverse blocking signal from an upstream trip unit, the trip unit initiates a trip timing sequence. If a blocking signal has been received from a downstream trip unit, the trip timing sequence is a restrained trip timing sequence. However, if a blocking signal has not been received from a downstream trip unit, the trip timing sequence is an unrestrained trip timing sequence.

Accordingly, as described herein, each circuit protection device of a particular tier notifies other circuit protection devices in a higher tier when the blocking threshold of a circuit protection device in the particular tier or in a lower tier has been exceeded. Each circuit protection device also notifies other circuit protection devices in a lower tier when the protective threshold has been exceeded. As such, each circuit protection device within hierarchical tiers may be set to the same trip thresholds without duplicating trip timing sequences within two tiers for the same fault current.

Figure 1:
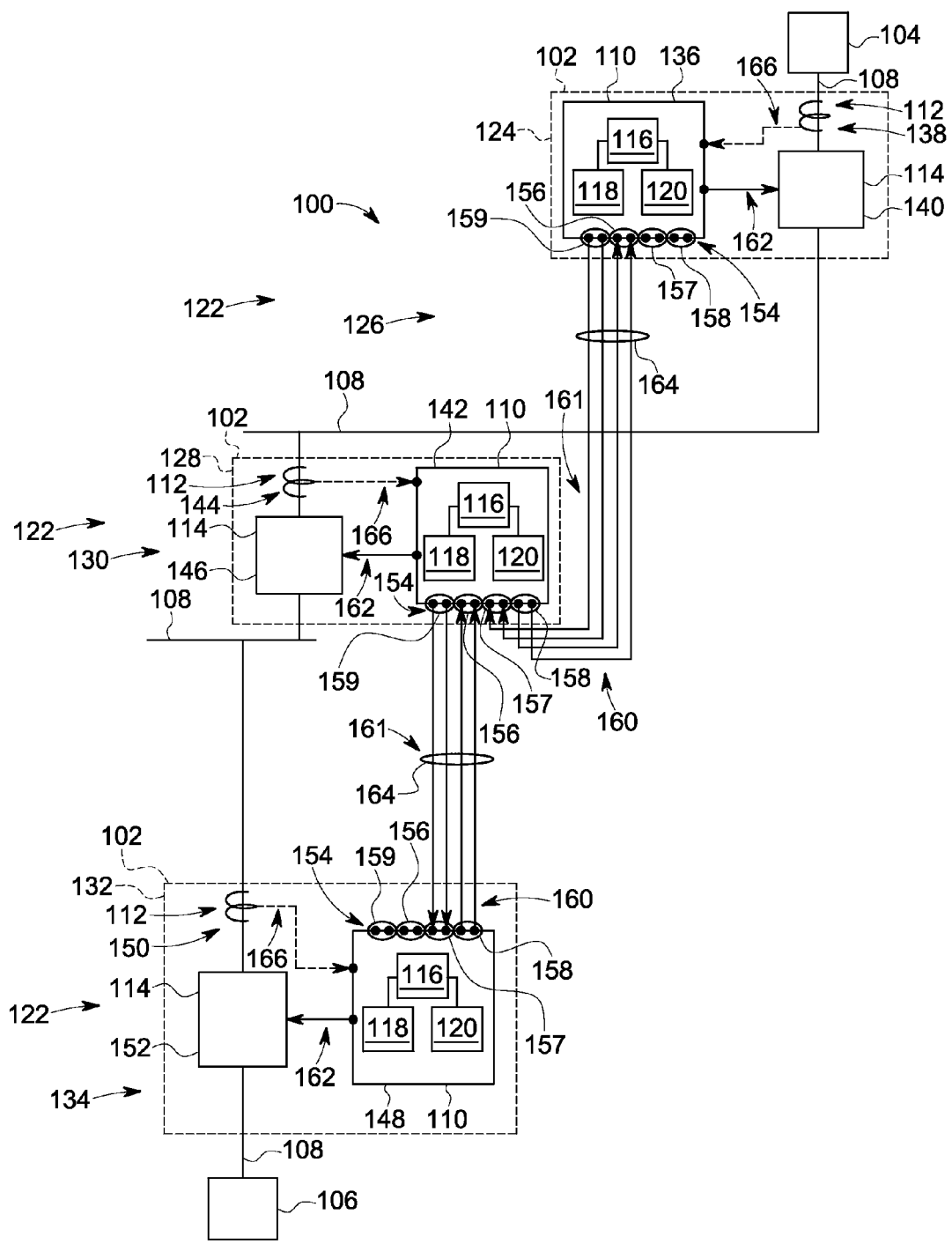
FIG. 1 is a schematic block diagram of an exemplary power distribution system.

FIG. 1 is a schematic block diagram of a portion of an exemplary power distribution system 100 illustrating a plurality of circuit protection devices 102. In one embodiment, circuit protection devices 102 are positioned within one or more switchgear units (not shown).

Each circuit protection device 102 is configured to programmably control a delivery of power from one or more electrical power sources 104 to one or more loads 106. Electrical power sources 104 may include, for example, one or more generators or other devices that provide electrical current (and resulting electrical power) to loads 106. The electrical current may be transmitted to loads 106 through one or more electrical distribution lines or busses 108 coupled to circuit protection devices 102. Loads 106 may include, but are not limited to only including, machinery, motors, lighting, and/or other electrical and mechanical equipment of a manufacturing or power generation or distribution facility.

In an exemplary embodiment, circuit protection device 102 is a circuit breaker. Alternatively, circuit protection device 102 may be any other device that enables power distribution system 100 to function as described herein. In an exemplary embodiment, each circuit protection device 102 includes a trip unit 110 operatively coupled to a sensor 112 and a trip mechanism 114. Trip unit 110, in an exemplary embodiment, is an electronic trip unit (ETU) that includes a processor 116 coupled to a memory 118 and a display device 120.

Sensor 112, in an exemplary embodiment, is a current sensor, such as a current transformer, a Rogowski coil, a Hall-effect sensor, and/or a shunt that measures a current flowing through trip mechanism 114 and/or circuit protection device 102. Alternatively, sensor 112 may include any other sensor that enables power distribution system 100 to function as described herein. In an exemplary embodiment, each sensor 112 generates a signal representative of the measured or detected current (hereinafter referred to as "current signal") flowing through an associated trip mechanism 114 and/or circuit protection device 102. In addition, each sensor 112 transmits the current signal to processor 116 associated with, or coupled to, trip mechanism 114. Each processor 116 is programmed to activate trip mechanism 114 to interrupt a current provided to a load 106 if the current signal, and/or the current represented by the current signal, exceeds a programmable current threshold, as described more fully herein.

Trip mechanism 114 includes, for example, one or more circuit breaker devices and/or arc containment devices. Exemplary circuit breaker devices include, for example, circuit switches, contact arms, and/or circuit interrupters that interrupt current flowing through the circuit breaker device to a load 106 coupled to the circuit breaker device. An exemplary arc containment device includes, for example, a containment assembly, a plurality of electrodes, a plasma gun, and a trigger circuit that causes the plasma gun to emit ablative plasma into a gap between the electrodes in order to divert energy into the containment assembly from an arc or other electrical fault that is detected on the circuit.

Each processor 116 controls the operation of a circuit protection device 102 and gathers measured operating condition data, such as data representative of a current measurement (also referred to herein as "current data"), from a sensor 112 associated with a trip mechanism 114 coupled to processor 116. Processor 116 stores the current data in a memory 118 coupled to processor 116. It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 118 stores program code and instructions, executable by processor 116, to control circuit protection device 102. Memory 118 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 118. Memory 118 may also be, or include, a detachable or removable memory, including, but not limited to, a suitable cartridge, disk, CD ROM, DVD or USB memory.

In an exemplary embodiment, display device 120 includes one or more light-emitting diodes (LEDs) that indicate a status of circuit protection device 102 and/or trip mechanism 114. For example, processor 116 may activate one or more components (e.g., LEDs) of display device 120 to indicate that circuit protection device 102 and/or trip mechanism 114 is active and/or operating normally, that a fault or failure has occurred, and/or any other status of trip mechanism 114 and/or circuit protection device 102. Alternatively, circuit protection device 102 does not include display device 120.

In an exemplary embodiment, circuit protection devices 102 are arranged in a hierarchy including a plurality of tiers 122, or circuit branches, to provide different levels of protection and monitoring to power distribution system 100. For example, in one embodiment, a first circuit protection device 124 is arranged in a first, or upstream, tier 126 to receive current from electrical power source 104. A second circuit protection device 128 is arranged in a second, or intermediate, tier 130 that is downstream of first circuit protection device 124. A third circuit protection device 132 is arranged in a third, or downstream, tier 134 that is downstream of second circuit protection device 128. Third circuit protection device 132 provides current received from electrical power source 104 (through first circuit protection device 124 and second circuit protection device 128) to load 106.

As used herein, the term "downstream" refers to a direction of current flow, for example, from electrical power source 104 towards load 106. The term "upstream" refers to a direction of current flow, for example, from load 106 towards electrical power source 104.

Moreover, first circuit protection device 124 includes a first trip unit 136, a first sensor 138, and a first trip mechanism 140, second circuit protection device 128 includes a second trip unit 142, a second sensor 144, and a second trip mechanism 146, and third circuit protection device 132 includes a third trip unit 148, a third sensor 150, and a third trip mechanism 152.

While FIG. 1 illustrates three circuit protection devices 102 arranged in three tiers 122, it should be recognized that any suitable number of circuit protection devices 102 may be arranged in any suitable number of tiers 122 to enable power distribution system 100 to function as described herein. For example, it should be recognized that one or more additional tiers 122 and/or circuit protection devices 102 may be disposed between electrical power source 104 and first circuit protection device 124 and/or first tier 126 in some embodiments. Additionally or alternatively, one or more additional tiers 122 and/or circuit protection devices 102 may be disposed between load 106 and third circuit protection device 132 in some embodiments.

As illustrated in FIG. 1, each trip unit 110 includes a plurality of ports 154 that receive signals from, and transmit signals to, other trip units 110. In an exemplary embodiment, ports 154 include at least one blocking signal input port 156, at least one reverse blocking signal input port 157, at least one blocking signal output port 158, and at least one reverse blocking signal output port 159. As is described more fully herein, blocking signal input port 156 and blocking signal output port 158 transmit one or more blocking signals 160 (also known as "forward blocking signals 160") between circuit protection devices 102, and reverse blocking signal input port 157 and reverse blocking signal output port 159 transmit one or more reverse blocking signals 161 between circuit protection devices 102.

In an exemplary embodiment, blocking signal 160 is generated by each trip unit 110 when an amount of current detected by sensor 112 exceeds a blocking threshold (not shown in FIG. 1) defined for an associated trip mechanism 114. In addition, blocking signal 160 is transmitted, or forwarded, to an upstream trip unit 110 if blocking signal 160 is received from a downstream trip unit 110. For example, blocking signal 160 of second trip unit 142 is transmitted to upstream trip unit 110 (e.g., first trip unit 136) if second trip unit 142 received blocking signal 160 from third trip unit 148 and/or if second trip unit 142 detected a current above the blocking threshold. In response to receiving blocking signal 160, first trip unit 136 (and each other trip unit 110 that receives blocking signal 160) shifts from an unrestrained mode of operation to a restrained mode of operation, as described more fully herein, to prevent first trip unit 136 and second trip unit 142 from operating at similar trip timing sequences.

In the unrestrained mode of operation, an unrestrained trip timing sequence is executed in which circuit protection device 102 trips if the current exceeds the protective threshold (or the blocking threshold if a reverse blocking signal 161 has been received) and an unrestrained time threshold is reached. In the restrained mode of operation, a restrained trip timing sequence is executed in which circuit protection device 102 trips if the current exceeds the protective threshold after a forward blocking signal 160 has been received (or the blocking threshold if both a forward blocking signal 160 and a reverse blocking signal 161 have been received) and a restrained time threshold is reached. If the restrained time threshold or the unrestrained time threshold is reached while the current is above the appropriate threshold and the appropriate blocking signals have been received, trip unit 110 generates trip signal 162. Alternatively, the unrestrained trip timing sequence and the restrained trip timing sequence may include any other actions or responses that enable trip units 110 to function as described herein. It should be recognized that the unrestrained trip timing sequence causes trip signal 162 to be generated in a period of time that is shorter than a period of time in which the restrained trip timing sequence causes trip signal 162 to be generated for currents above the respective current thresholds.

Reverse blocking signal 161 is generated by each trip unit 110 when the amount of current detected by sensor 112 exceeds the protective threshold. Reverse blocking signal 161 is transmitted to each downstream trip unit 110 in the tier below trip unit 110 that generated reverse blocking signal 161. For example, first trip unit 136 transmits reverse blocking signal 161 to second trip unit 142 if the amount of current detected by first sensor 138 exceeds the protective threshold of first trip unit 136. Upon receipt of reverse blocking signal 161, each downstream trip unit 110 performs a logical AND operation with reverse blocking signal 161 and with a determination whether the blocking threshold of downstream trip unit 110 has been exceeded. If the result of the logical AND operation is a logical 1 value (i.e., if reverse blocking signal 161 has been received and if the current detected by downstream trip unit 110 exceeds the blocking threshold of downstream trip unit 110), downstream trip unit 110 initiates an unrestrained trip timing sequence. However, if the result of the logical AND operation is 0 (i.e., if either reverse blocking signal 161 was not received or if the current does not exceed the blocking threshold), downstream trip unit 110 does not initiate the unrestrained trip timing sequence based on the blocking threshold being exceeded. It should be recognized that the above-described logical operations assume that blocking signal 160 and reverse blocking signal 161 are active high signals. However, if blocking signal 160 and/or reverse blocking signal 161 are any other signals (such as active low signals), any suitable operation may be performed on signals 160 and/or 161 to enable circuit protection device 102 to function as described herein.

Ports 154 of a trip unit 110 are coupled to ports 154 of other trip units 110 by one or more conductors 164. In an exemplary embodiment, each port 154 includes a positive terminal and a negative terminal for coupling to conductors 164 carrying positive and negative signals, respectively. For example, conductors 164 transmit positive and negative components of blocking signals 160 and reverse blocking signals 161 to the positive and negative terminals of ports 154. Alternatively, ports 154 may receive any suitable signal and/or may include any suitable number of terminals that enables trip units 110 to function as described herein. It should be recognized that signals of the same polarity may be used instead of signals of positive and negative polarity. For example, a "positive" signal may be a signal that has an amplitude that is higher than an amplitude of a "negative" signal.

In an exemplary embodiment, blocking signal output port 158 of trip unit 110 (e.g., second trip unit 142) is coupled to blocking signal input port 156 of upstream trip unit 110 (e.g., first trip unit 136). In a specific embodiment, a single circuit protection device 102 is positioned at the next tier upstream of the referenced circuit protection device 102 (and the associated trip unit 110) such that blocking signal output port 158 of the referenced trip unit 110 is coupled to blocking signal input port 156 of the upstream trip unit 110 by at least one conductor 164. In addition, blocking signal input port 156 of the referenced trip unit 110 (e.g., second trip unit 142) is coupled to blocking signal output port 158 of one or more downstream trip units 110 (e.g., third trip unit 148) by at least one conductor 164.

Reverse blocking signal input port 157 of trip unit 110 (e.g., second trip unit 142) is coupled to reverse blocking signal output port 159 of upstream trip unit 110 (e.g., first trip unit 136) by at least one conductor 348. In addition, reverse blocking signal output port 159 of trip unit 110 (e.g., second trip unit 142) is coupled to reverse blocking signal input port 157 of downstream trip unit 110 (e.g., third trip unit 148) by at least one conductor 348.

Each circuit protection device 102 (and each associated trip unit 110) is configured as described above such that trip units 110 receive one or more blocking signals 160 from downstream trip units 110 through blocking signal input port 156 and transmit one or more blocking signals 160 to upstream trip units 110 through blocking signal output port 158. In addition, each trip unit 110 receives reverse blocking signals 161 from upstream trip units 110 through reverse blocking signal input port 157 and transmits reverse blocking signals 161 to downstream trip units 110 through reverse blocking signal output port 159.

In an exemplary embodiment, blocking signals 160 received from a downstream trip unit 110 are automatically forwarded on to upstream trip units 110. For example, if second trip unit 142 receives blocking signal 160 from third trip unit 148, second trip unit 142 transmits blocking signal 160 to first trip unit 136. In addition, reverse blocking signals 161 received from an upstream trip unit 110 are automatically forwarded on to downstream trip units 110. For example, if second trip unit 142 receives reverse blocking signal 161 from first trip unit 136, second trip unit 142 transmits reverse blocking signal 161 to third trip unit 148.

In addition, sensor 112 measures current flowing through trip mechanism 114 (e.g., through electrical distribution bus 108 that is coupled to trip mechanism 114). Sensor 112 generates a current signal 166 representative of the measured or detected current flowing through trip mechanism 114, and transmits current signal 166 to trip unit 110. Trip unit 110 is programmed to activate trip mechanism 114 based on current signal 166 by transmitting trip signal 162 to trip mechanism 114, thus causing trip mechanism 114 to interrupt the current flowing therethrough as described above.

During operation, if a fault occurs proximate to, and downstream from, second circuit protection device 128, for example, second sensor 144 detects the total amount of current (including a fault current) flowing through electrical distribution bus 108. Second sensor 144 transmits current signal 166 to second trip unit 142, and second trip unit 142 compares the amount of current represented by current signal 166 to one or more predetermined current thresholds of second trip unit 142, such as the blocking threshold.

If the detected amount of current exceeds the blocking threshold, second trip unit 142 transmits blocking signal 160 to first trip unit 136. In addition, if the detected amount of current exceeds the protective threshold, second trip unit 142 initiates a trip timing sequence, such as the unrestrained trip timing sequence or the restrained trip timing sequence. In contrast, if the detected amount of current exceeds the blocking threshold but does not exceed the protective threshold, second trip unit 142 refrains from initiating a trip timing sequence, unless a reverse blocking signal 161 has been received.

Upon the receipt of blocking signal 160, first trip unit 136 switches to operating in the restrained mode of operation. If the current exceeds the protective threshold of first trip unit 136, first trip unit 136 transmits reverse blocking signal 161 to second trip unit 142. First trip unit 136 also initiates a restrained trip timing sequence by accumulating time values in which the current exceeds the protective threshold until the restrained time threshold is reached. If the restrained time threshold is reached, first trip unit 136 generates trip signal 162.

If second trip unit 142 receives reverse blocking signal 161, second trip unit 142 performs a logical AND operation with reverse blocking signal 161 and with a determination of whether the current detected by second sensor 144 exceeds the blocking threshold of second trip unit 142. If the result of the AND operation is a logical value of 1 (i.e., if second trip unit 142 received reverse blocking signal 161 from first trip unit 136 and the current exceeds the blocking threshold), second trip unit 142 initiates an unrestrained trip timing sequence. Second trip unit 142 accumulates time values in which the current exceeds the blocking threshold until the unrestrained time threshold is reached. If the unrestrained time threshold is reached, second trip unit 142 generates trip signal 162.

Figure 2:
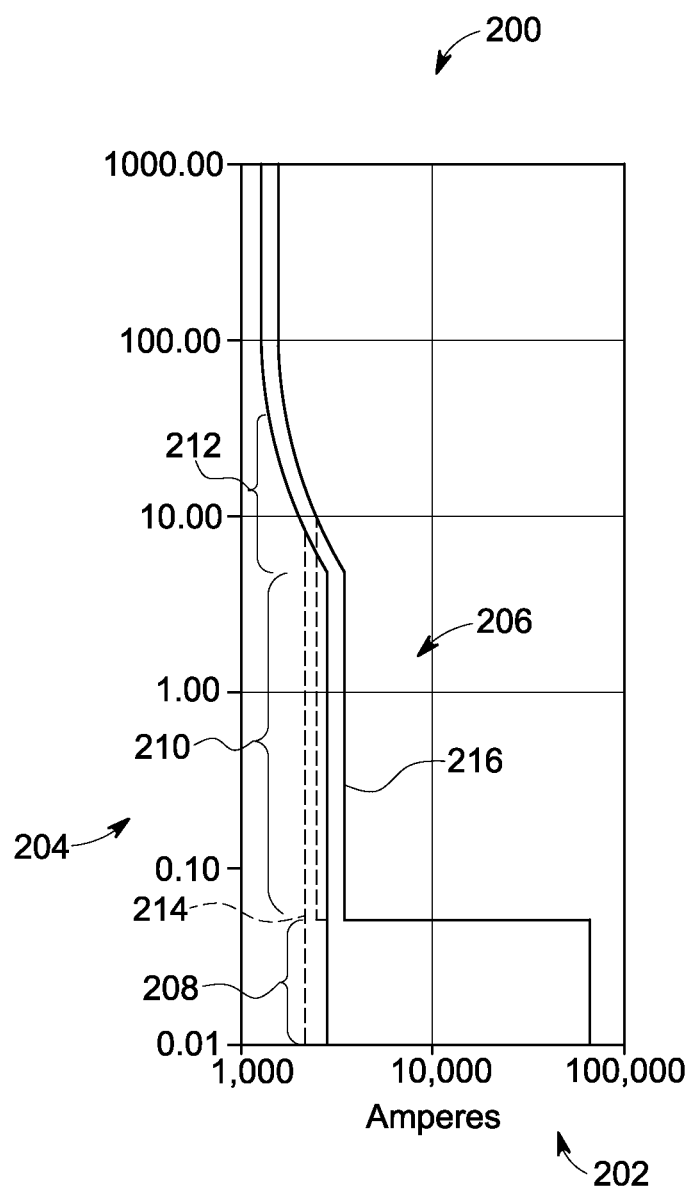
FIG. 2 is a graph of an exemplary trip curve for a circuit protection device shown in FIG. 1 operating in an unrestrained mode of operation.
Figure 3:
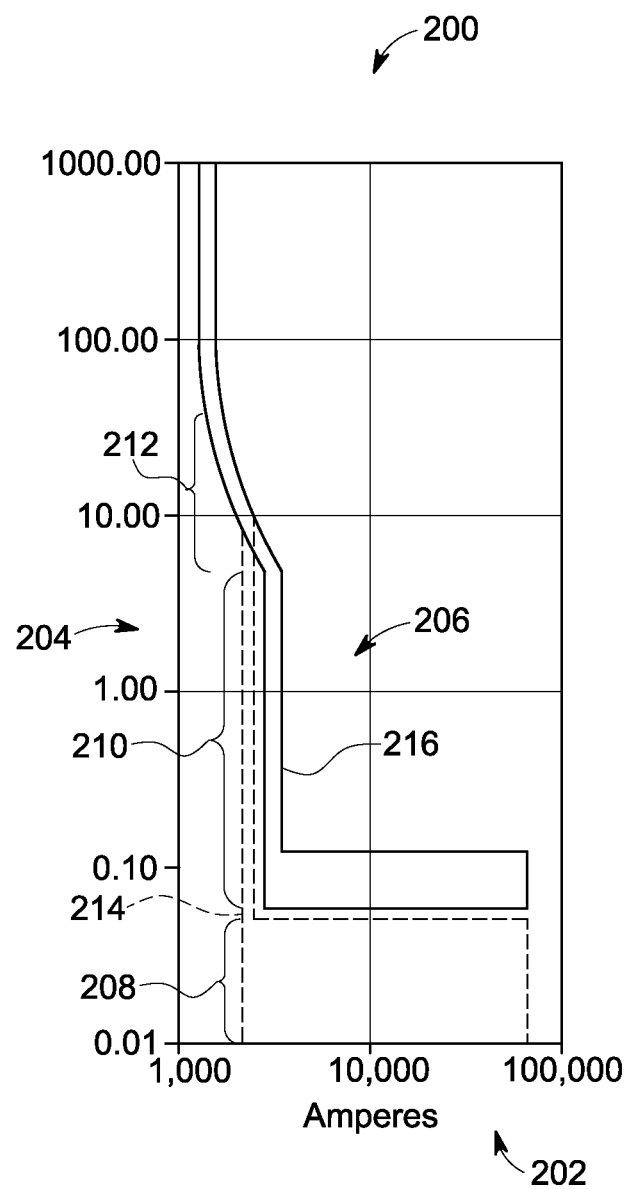
FIG. 3 is a graph of the trip curve shown in FIG. 2 illustrating the circuit protection device operating in a restrained mode of operation.

FIGS. 2 and 3 illustrate a graph of an exemplary trip curve 200 that may be used with trip unit 110 (shown in FIG. 1). More specifically, FIG. 2 illustrates a graph of trip curve 200 of trip unit 110 operating in an unrestrained mode, and FIG. 3 illustrates a graph of trip curve 200 of trip unit 110 operating in a restrained mode. As shown in FIGS. 2 and 3, trip curve 200 is defined with respect to a measured amount of current 202 flowing through trip mechanism 114 (shown in FIG. 1) over time 204.

In an exemplary embodiment, trip curve 200 defines one or more boundaries between desired and undesired current levels (i.e., measured current 202) as a function of time 204. The boundaries include one or more current thresholds 206 defined at different operating points or regions of trip unit 110. It should be recognized that each threshold 206 is illustrated as having two lines or boundaries that are representative of a tolerance, or margin of error, of sensor 112 and/or of other components of circuit protection device 102 (shown in FIG. 1). Accordingly, each threshold 206 may be viewed as including an upper boundary and a lower boundary that are representative of an effect on threshold 206 of a positive and a negative tolerance or margin of error.

In an exemplary embodiment, a plurality of regions, such as one or more instantaneous pickup regions 208 and 210, and an overload region 212, are defined for each trip curve 200. In other embodiments, a short time pickup region and/or threshold may be defined in addition to, or instead of, instantaneous pickup regions 208 and/or 210. In addition, current thresholds 206 include a blocking threshold 214 and a protective (or unrestrained) threshold 216 that are defined or determined for at least one region, such as instantaneous pickup region 208. Blocking threshold 214 and protective threshold 216 are determined by trip unit 110 (e.g., by processor 116) and are stored within trip unit 110 (e.g., within memory 118).

In an exemplary embodiment, trip unit 110 is programmed to be operated an unrestrained mode and a restrained mode. In the unrestrained mode of operation (shown in FIG. 2), trip curve 200 enables trip unit 110 to trip after a "normal," or unrestrained time threshold has been exceeded. In the restrained mode of operation (shown with protective threshold 216 using solid lines in FIG. 3), trip curve 200 enables trip unit 110 to trip after a delayed, or restrained, time threshold has been exceeded.

Protective threshold 216 establishes a boundary for generating a trip signal if the measured or detected current flowing through trip mechanism 114 exceeds protective threshold 216. Blocking threshold 214 establishes a boundary for use in generating a blocking signal if the measured or detected current flowing through trip mechanism 114 exceeds blocking threshold 214. The trip signal is received by trip mechanism 114 and causes trip mechanism 114 to trip, or interrupt current flowing through trip mechanism 114.

In an exemplary embodiment, blocking threshold 214 is set to a value that is less than protective threshold 216 by a value about two times the tolerance of circuit protection device 102. In one embodiment, the tolerance of circuit protection device 102 is about 10%. Accordingly, in such an embodiment, blocking threshold 214 is set, or programmed, to be a current amplitude equal to about 20% lower than protective threshold 216. For example, if protective threshold 216 is set to a value of about 2000 amperes (A), blocking threshold 214 is set to a value of about 1600 A. Alternatively, blocking threshold 214 is set to any suitable value that is less than protective threshold 216. In an exemplary embodiment, a value for protective threshold 216 is input and/or set by a user. Blocking threshold 214 is automatically determined and set by processor 116, for example, to the value described above based on the input value. Accordingly, processor 116 of trip unit 110 determines protective threshold 216 (based on the value input by the user) as well as blocking threshold 214. Alternatively, the user may set blocking threshold 214 to a value below protective threshold 216.

Figure 4:
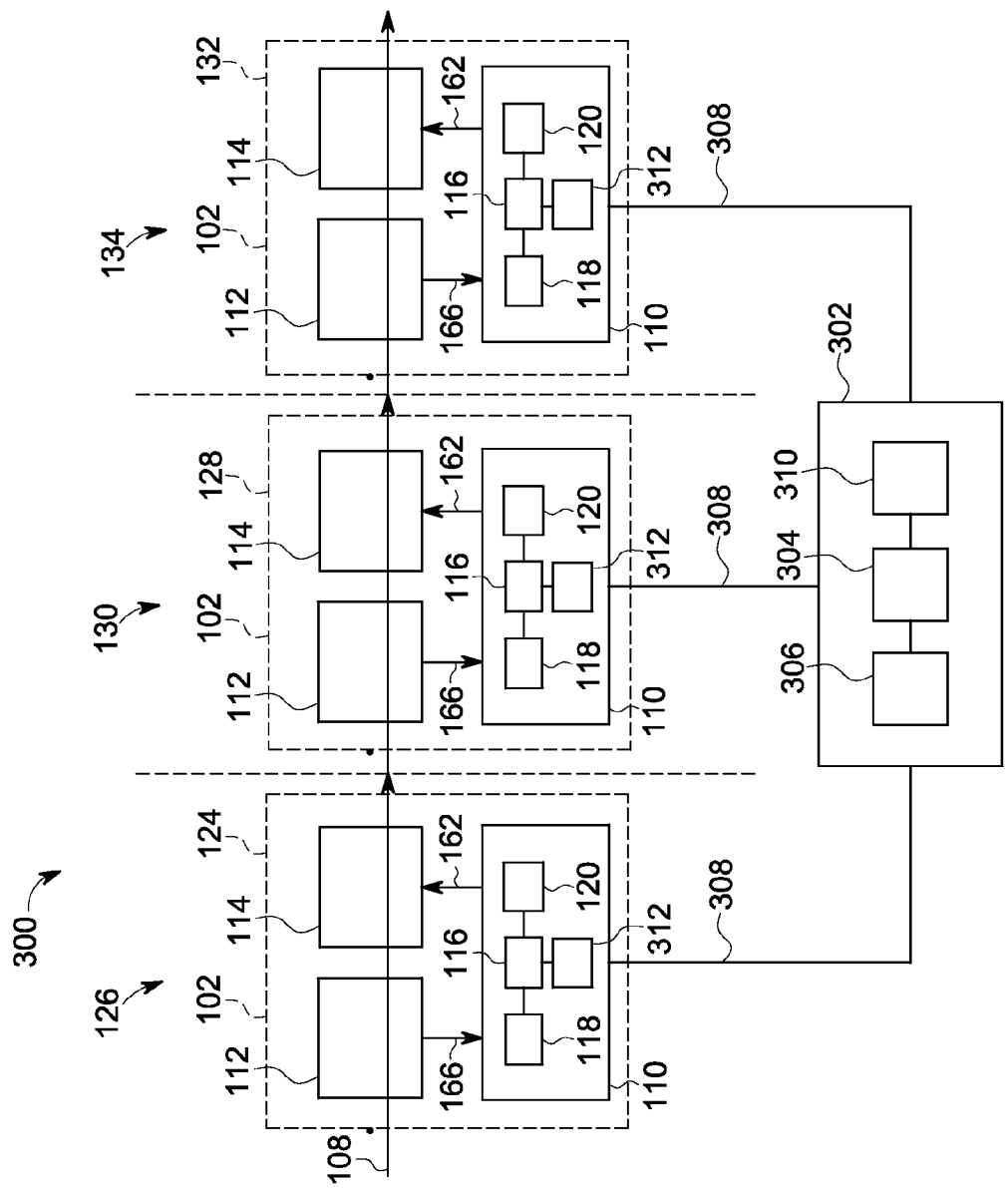
FIG. 4 is a schematic block diagram of another exemplary power distribution system.

FIG. 4 is a schematic block diagram of another exemplary power distribution system 300. In an exemplary embodiment, distribution system 300 includes a plurality of circuit protection devices 102 arranged in a hierarchy including a plurality of tiers 122 in a similar manner as described above with respect to FIG. 1. Power distribution system 300 includes a central controller 302 coupled to each circuit protection device 102 for controlling the operation of circuit protection devices 102. In other respects, unless otherwise specified, power distribution system 300 is substantially similar to power distribution system 100 (shown in FIG. 1), and similar components are labeled in FIG. 4 with the same reference numerals used in FIG. 1.

Central controller 302 includes a processor 304 and a memory 306 coupled to processor 304. Processor 304 communicates with, and controls, circuit protection devices 102 through a network 308. For example, central controller 302 includes a central communication unit 310 that enables transmitting and receiving data and/or commands between processor 304 and circuit protection devices 102 through network 308. In an exemplary embodiment, central communication unit 310 is coupled to, and communicates with, a local communication device 312 within each trip unit 110.

Network 308, in an exemplary embodiment, is an International Electrotechnical Commission (IEC) 61850, Modbus, Ethernet, or Profibus based network. Alternatively, network 308 may include any suitable network based on a point-to-point topology, a bus topology, or any other topology that enables power distribution system 300 to function as described herein.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 306 stores program code and instructions, executable by processor 304, to control and/or monitor circuit protection devices 102. In an exemplary embodiment, memory 306 is substantially similar to memory 118 (shown in FIG. 1).

In an exemplary embodiment, circuit protection devices 102 are not communicatively coupled together and are not programmed with current thresholds 206 for associated trip units 110. Rather, central controller 302 is programmed with trip thresholds 206 for trip unit 110 of circuit protection devices 102. Accordingly, central controller 302 determines, or is programmed with, a trip curve 200, including a blocking threshold 214 and a protective threshold 216 for each circuit protection device 102. Central controller 302 receives current measurements from sensor 112 of each circuit protection device 102 over network 308 for use in controlling the operation of circuit protection devices 102. In addition, central controller 302 generates trip signal 162 and transmits trip signal 162 over network 308 to a circuit protection device 102 to activate trip mechanism 114 if the measured current exceeds an appropriate threshold 206 (e.g., protective threshold 216) for an appropriate amount of time (e.g., the unrestrained time threshold or the restrained time threshold) in a similar manner as described above.

In an exemplary embodiment, and in contrast to power distribution system 100 described in FIG. 1, blocking signals 160 and reverse blocking signals 161 are not transmitted between circuit protection devices 102. Rather, central controller 302 determines whether current flowing through a circuit protection device 102 exceeds a threshold 206 for that circuit protection device 102 and operates trip units 110 of upstream and/or downstream circuit protection devices 102 accordingly.

For example, if central controller 302 determines that the current flowing through a circuit protection device 102 exceeds blocking threshold 214 of circuit protection device 102, central controller 302 automatically switches the operation of trip unit 110 to the restrained mode of operation. In a similar manner, if central controller 302 determines that current flowing through a downstream circuit protection device 102 exceeds blocking threshold 214 of downstream circuit protection device 214, central controller 302 switches trip unit 110 of each upstream circuit protection device 102 to operate in the restrained mode of operation.

In addition, if central controller 302 determines that the current flowing through circuit protection device 110 exceeds blocking threshold 214, central controller 302 determines whether the current flowing through an upstream circuit protection device 102 exceeds protective threshold 216 for upstream circuit protection device 102. Central controller 302 initiates an unrestrained trip timing sequence if both conditions are satisfied (i.e., blocking threshold 214 is exceeded for circuit protection device 102 and if protective threshold 216 of upstream circuit protection device 102 is exceeded). Central controller 302 also initiates the unrestrained trip timing sequence if protective threshold 216 of circuit protection device 102 is exceeded while blocking threshold 214 of a downstream circuit protection device 102 has not been exceeded. However, if blocking threshold 214 of a downstream circuit protection device 102 is exceeded, central controller 302 initiates a restrained trip timing sequence if protective threshold 216 of circuit protection device 102 is exceeded.

If the trip timing sequence completes for a circuit protection device 102 (i.e., if the restrained timing threshold or the unrestrained timing threshold is exceeded), central controller 302 transmits trip signal 162 to circuit protection device 102 to cause trip mechanism 114 to interrupt current flowing through circuit protection device 102. In other respects, central controller 302 controls the operation of power distribution system 300 in a similar manner as trip units 110 control the operation of power distribution system 100. For example, if blocking threshold 214 for a circuit protection device 102 is exceeded but protective threshold 216 for circuit protection device 102 is not exceeded (or is not exceeded for the unrestrained time threshold), and if protective threshold 216 for upstream circuit protection devices 102 are not exceeded, central controller 302 refrains from transmitting trip signal 162 to circuit protection device 102.

Figure 5:
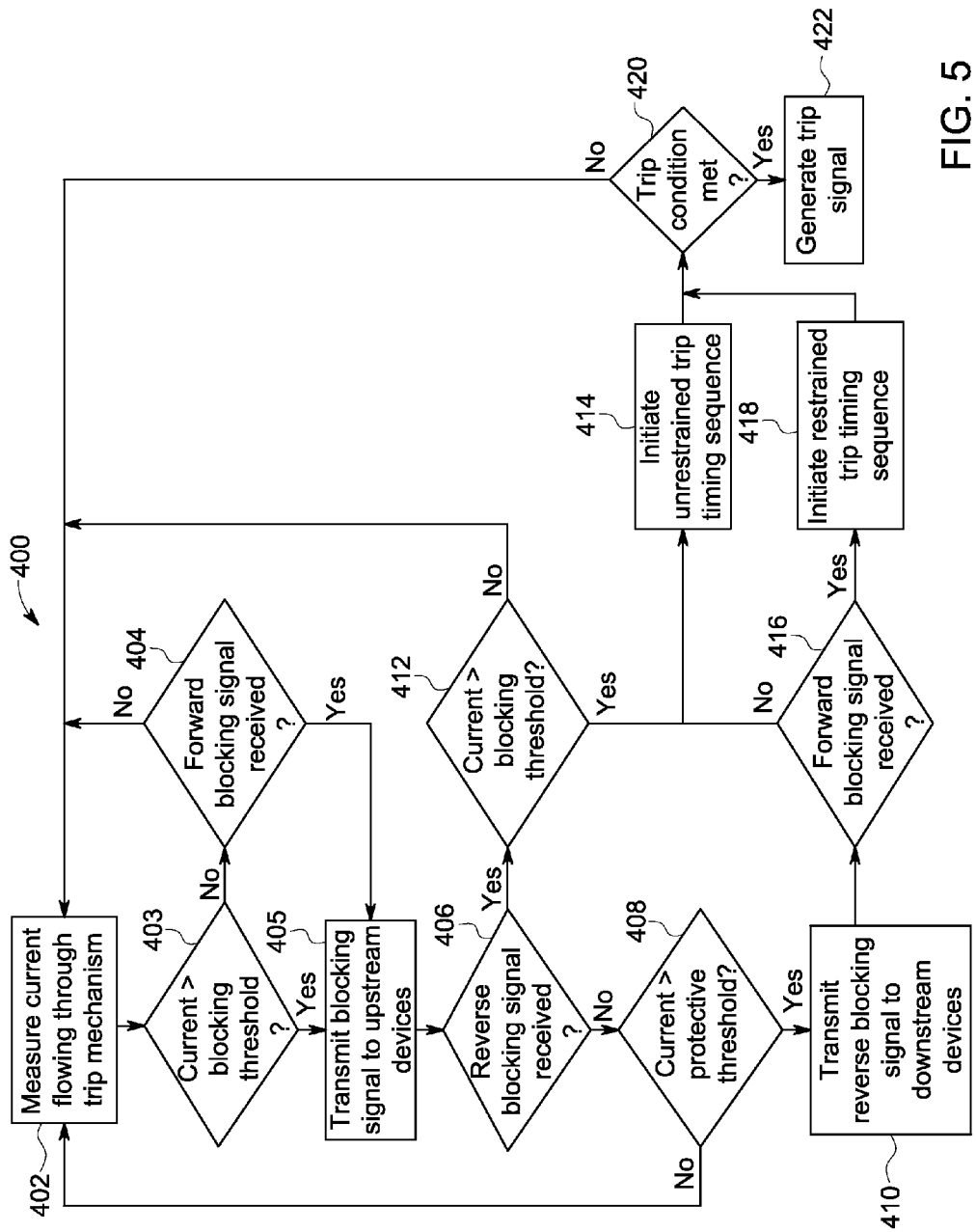
FIG. 5 is a flow diagram of an exemplary method of operating a power distribution system, such as the power distribution system shown in FIG. 1 or the power distribution system shown in FIG. 4.

FIG. 5 is a flow diagram of an exemplary method 400 of operating a power distribution system, such as power distribution system 100 (shown in FIG. 1) or power distribution system 300 (shown in FIG. 4). In an exemplary embodiment, method 400 is executed by processor 116 of each trip unit 110. Alternatively, method 400 is executed by a central processor communicatively coupled to trip units 110, such as processor 304 of central controller 302. In an exemplary embodiment, a plurality of computer-executable instructions are embodied within a computer-readable medium, such as memory 118 (shown in FIG. 1) or memory 306 (shown in FIG. 4). The instructions, when executed by the processor, cause the processor to execute the steps of method 400 and/or to function as described herein.

In an exemplary embodiment, current flowing through circuit protection device 102 (i.e., through trip mechanism 114) is measured 402 by sensor 112, for example, and current signals 166 representative of the measured current ("current measurements") are transmitted to trip unit 110. Trip unit 110 records or accumulates the current measurements during a predetermined period, such as during a half cycle of a fundamental frequency of power distribution system 100. Alternatively, trip unit 110 records or accumulates the current measurements during other suitable periods. For example, a shorter period may be used for instantaneous trip algorithms, and/or longer periods may be used for thermal trip algorithms. Trip unit 110 determines 403 whether the measured current exceeds blocking threshold 214 (shown in FIG. 2) of trip unit 110, for example, based on the current measurements accumulated during the predetermined period.

If the measured current is determined 403 to exceed blocking threshold 214, or if a forward blocking signal 160 is received 404 from a trip unit 110 of a downstream circuit protection device 102, a blocking signal 160 is transmitted 405 to trip units 110 of upstream circuit protection devices 102 (if present). In contrast, if the measured current does not exceed blocking threshold 214 and if no blocking signal 160 is received from a downstream circuit protection device 102, circuit protection device 102 returns to measuring 402 the current flowing through trip mechanism 114 (i.e., circuit protection device 102 waits for the next current measurement).

In addition, circuit protection device 102 determines 406 whether a reverse blocking signal 161 has been received from a trip unit 110 of an upstream circuit protection device 102. If a reverse blocking signal 161 has not been received, circuit protection device 102 determines 408 whether the current flowing through circuit protection device 102 exceeds protective threshold 216. If the current does not exceed protective threshold 216, circuit protection device 102 returns to measuring 402 the current flowing through trip mechanism 114. If the measured current exceeds protective threshold 216, circuit protection device 102 transmits 410 a reverse blocking signal 161 to downstream trip units 110 to notify trip units 110 that protective threshold 216 has been exceeded.

If reverse blocking signal 161 was received 406, circuit protection device 102 determines 412 whether the current flowing through trip mechanism 114 exceeds blocking threshold 214 to determine whether to initiate a trip timing sequence. If the current does not exceed blocking threshold 214, circuit protection device 102 returns to measuring 402 the current flowing through trip mechanism 114. However, if the current exceeds blocking threshold 214, in conjunction with the receipt of reverse blocking signal 161, circuit protection device 102 initiates 414 an unrestrained trip timing sequence.

In contrast, if reverse blocking signal 161 has not been received 406 but the current is determined 408 to exceed protective threshold 216, circuit protection device 102 determines 416 whether a forward blocking signal 160 has been received from a downstream trip unit 110. If blocking signal 160 has not been received, circuit protection device 102 initiates 414 the unrestrained trip timing sequence. However, if blocking signal 160 has been received, circuit protection device 102 initiates 418 a restrained trip timing sequence.

During the trip timing sequence (i.e., the restrained trip timing sequence or the unrestrained trip timing sequence), trip unit 110 accumulates time values (such as seconds) during which the measured current exceeds the applicable threshold 206 (e.g., blocking threshold 214 or protective threshold 216). If the accumulated time values exceed the time threshold for the respective threshold (e.g., the unrestrained time threshold or the restrained time threshold), circuit protection device 102 determines 420 that a trip condition is met. Trip unit 110 generates 422 a trip signal 162 to trip mechanism 114 coupled to trip unit 110 to interrupt the current flowing through trip mechanism 114.

If the accumulated time values do not exceed the time threshold for the respective current threshold 206, circuit protection device 102 returns to measuring 402 the current flowing through trip mechanism 114. It should be recognized that, as each current measurement received 402 may be above or below the selected threshold 206 and a blocking signal 160 or a reverse blocking signal 161 may be received at any time, method 400 is continuously executed to ensure that circuit protection device 102 operates as desired.

A technical effect of the methods and systems described herein may include one or more of: (a) measuring a current flowing through a circuit protection device; (b) determining, by a processor, whether a current exceeds at least one of a blocking threshold and a protective threshold, wherein the blocking threshold is lower than the protective threshold; (c) transmitting a forward blocking signal to a first circuit protection device upon a determination that a current exceeds a blocking threshold; and (d) generating a reverse blocking signal upon a determination that a current exceeds a protective threshold.

Exemplary embodiments of power distribution systems and methods of operating a power distribution system are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the power system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power distribution system comprising:
   a first circuit protection device; and
   a second circuit protection device coupled to said first circuit protection device downstream of said first circuit protection device, said second circuit protection device comprising:
      a trip mechanism configured to interrupt a current flowing through said second circuit protection device; and
      a trip unit operatively coupled to said trip mechanism, said trip unit configured to:
         determine, for said second circuit protection device, a protective threshold and a blocking threshold that is lower than the protective threshold;
         transmit a forward blocking signal to said first circuit protection device upon a determination that the current exceeds the blocking threshold; and
         generate a reverse blocking signal upon a determination that the current exceeds the protective threshold.

2. A power distribution system in accordance with claim 1, wherein said trip unit is further configured to activate said trip mechanism based on the determination that the current exceeds the protective threshold and that a trip timing sequence has completed.

3. A power distribution system in accordance with claim 1, wherein said first circuit protection device is configured to transmit a reverse blocking signal to said second circuit protection device based on an amount of current flowing through said first circuit protection device.

4. A power distribution system in accordance with claim 3, wherein said second circuit protection device is configured to activate said trip mechanism based on a determination that said first circuit protection device transmitted the reverse blocking signal to said second circuit protection device and that said second circuit protection device determined that the current flowing through said second circuit protection device exceeds the blocking threshold.

5. A power distribution system in accordance with claim 1, wherein said trip unit is configured to determine, for said second circuit protection device, an unrestrained time threshold, said second circuit protection device is configured to operate in an unrestrained mode of operation in which a trip signal is generated upon a determination that one of:
   the current exceeds the protective threshold for a time that exceeds the unrestrained time threshold; and
   said first circuit protection device transmitted a reverse blocking signal to said second circuit protection device and the current exceeds the blocking threshold for a time that exceeds the unrestrained time threshold.

6. A power distribution system in accordance with claim 5, wherein said trip unit is configured to determine, for said second circuit protection device, a restrained time threshold, said second circuit protection device is configured to operate in a restrained mode of operation in which a trip signal is generated upon a determination that a forward blocking signal has been received and that the current exceeds the protective threshold for a time that exceeds the restrained time threshold.

7. A power distribution system in accordance with claim 6, further comprising a third circuit protection device coupled to said second circuit protection device downstream of said second circuit protection device, said second circuit protection device is configured to switch from the unrestrained mode of operation to the restrained mode of operation upon receiving a forward blocking signal from said third circuit protection device.

8. A power distribution system in accordance with claim 7, wherein said second circuit protection device is configured to transmit, to said first circuit protection device, the forward blocking signal received from said third circuit protection device.

9. A power distribution system comprising:
   a first circuit protection device;
   a second circuit protection device coupled to said first circuit protection device downstream of said first circuit protection device; and
   a controller coupled to said first circuit protection device and to said second circuit protection device, said controller configured to:

determine a first protective threshold for said first circuit protection device;

determine a second protective threshold and a blocking threshold for said second circuit protection device, wherein the blocking threshold is lower than the second protective threshold;

determine whether a current flowing through said first circuit protection device exceeds the first protective threshold;

determine whether a current flowing through said second circuit protection device exceeds the blocking threshold; and transmit a trip signal to said second circuit protection device upon the determination that the current flowing through said first circuit protection device exceeds the first protective threshold and upon the determination that the current flowing through said second circuit protection device exceeds the blocking threshold for a predetermined amount of time.

10. A power distribution system in accordance with claim 9, wherein the blocking threshold is a first blocking threshold, said power distribution system further comprising a third circuit protection device coupled to said controller and to said second circuit protection device downstream of said second circuit protection device, wherein said controller is further configured to determine a second blocking threshold for said third circuit protection device.

11. A power distribution system in accordance with claim 10, wherein a restrained mode of operation and an unrestrained mode of operation are defined for said second circuit protection device, wherein said controller is further configured to switch said second circuit protection device from the unrestrained mode of operation to the restrained mode of operation upon a determination that a current flowing through said third circuit protection device exceeds the second blocking threshold.

12. A power distribution system in accordance with claim 11, wherein said controller is configured to transmit a trip signal to said second circuit protection device upon a determination that the current flowing through said second circuit protection device exceeds the second protective threshold for a predetermined amount of time and upon a determination that a current flowing through said third circuit protection device exceeds the second blocking threshold while said second circuit protection device is operating in the restrained mode of operation.

13. A power distribution system in accordance with claim 9, wherein said controller is further configured to refrain from transmitting a trip signal to said second circuit protection device upon a determination that the current flowing through said second circuit protection device does not exceed the second protective threshold for a predetermined amount of time and upon a determination that the current flowing through said first circuit protection device does not exceed the first protective threshold.

14. A method of operating a power distribution system including a first circuit protection device and a second circuit protection device coupled to the first circuit protection device downstream of the first circuit protection device, said method comprising:

measuring a current flowing through the second circuit protection device;

determining, by a processor, whether the current exceeds at least one of a blocking threshold and a protective threshold, wherein the blocking threshold is lower than the protective threshold;

transmitting a forward blocking signal to the first circuit protection device upon a determination that the current exceeds the blocking threshold; and generating a reverse blocking signal upon a determination that the current exceeds the protective threshold.

15. A method in accordance with claim 14, further comprising activating a trip mechanism based on the determination that the current exceeds the protective threshold and that a trip timing sequence has completed.

16. A method in accordance with claim 14, further comprising transmitting a reverse blocking signal from the first circuit protection device to the second circuit protection device based on an amount of current flowing through the first circuit protection device.

17. A method in accordance with claim 16, further comprising activating a trip mechanism based on a determination that the first circuit protection device transmitted the reverse blocking signal to the second circuit protection device and that the current flowing through the second circuit protection device exceeds the blocking threshold.

18. A method in accordance with claim 14, wherein an unrestrained time threshold is determined for the second circuit protection device and the second circuit protection device includes a trip mechanism configured to interrupt the current flowing through the second circuit protection device, said method further comprising activating the trip mechanism upon a determination that one of:

the current exceeds the protective threshold for a time that exceeds the unrestrained time threshold; and the first circuit protection device transmitted a reverse blocking signal to the second circuit protection device and the current exceeds the blocking threshold for a time that exceeds the unrestrained time threshold.

19. A method in accordance with claim 18, wherein a restrained time threshold is determined for the second circuit protection device, said method further comprising activating the trip mechanism upon a determination that a forward blocking signal has been received and that the current exceeds the protective threshold for a time that exceeds the restrained time threshold.

20. A method in accordance with claim 14, wherein a third circuit protection device is coupled to the second circuit protection device downstream from the second circuit protection device, said method further comprising receiving a forward blocking signal from the third circuit protection device and transmitting the received forward blocking signal to the first circuit protection device.

* * * * *